United States Patent [19]

Ehler et al.

[11] Patent Number: 4,782,446

[45] Date of Patent: Nov. 1, 1988

[54] VIBRATOR QUALITY CONTROL METHOD AND SYSTEM

[75] Inventors: Jerry W. Ehler; O. Guy Marney, Jr.; Randol R. Read; Daniel T. Johnson; Jerome D. McCoy, Jr., all of Tulsa, Okla.

[73] Assignee: Amoco Corporation, Chicago, Ill.

[21] Appl. No.: 56,494

[22] Filed: May 29, 1987

[51] Int. Cl.⁴ .............................................. G01V 1/24
[52] U.S. Cl. ............................... 364/421; 364/571.01; 367/41; 367/190
[58] Field of Search ................ 364/571, 421; 367/41, 367/190

[56] References Cited

U.S. PATENT DOCUMENTS

| | | | |
|---|---|---|---|
| 3,863,202 | 1/1975 | Landrum | 367/190 |
| 3,881,167 | 4/1975 | Pelton et al. | 367/190 |
| 3,979,715 | 9/1976 | Hufstedler et al. | 367/190 |
| 4,056,163 | 11/1977 | Wood et al. | 367/190 |
| 4,564,927 | 1/1986 | Kolb | 364/421 |
| 4,637,002 | 1/1987 | Sallas | 367/190 |

OTHER PUBLICATIONS

Sales Brochure of Pelton Company, Inc.—Vibra*-Chek—2 pages.

Primary Examiner—Patrick R. Salce
Assistant Examiner—Jeffrey Starratt
Attorney, Agent, or Firm—Timothy D. Stanley

[57] ABSTRACT

A field quality control system and real-time method for evaluating the performance of swept frequency vibrators is provided. The system includes independent sensing means adapted to be mounted with the swept frequency vibrators for developing signals representative of reaction mass accelerations and baseplate accelerations, and means for monitoring the swept frequency vibrator's pilot signal. The system also includes a signal calculating means for determining vibrator operating characteristics from the pilot sweep signal, reaction mass acceleration signal, and baseplate acceleration signal and processing means for processing the vibrator operating characteristics to obtain analysis characteristics for evaluating and adjusting the performance of the swept frequency vibrator. In operation, the present invention provides a method for analysis characteristics to analyze and adjust the performance of swept frequency vibrators in real-time on location.

13 Claims, 7 Drawing Sheets

VIBRATOR QUALITY CONTROL METHOD AND SYSTEM

BACKGROUND

This invention relates generally to seismic exploration and more particularly to a field quality control system and real-time method for analyzing and adjusting the performance of swept frequency vibrators for use in seismic exploration.

The general method of seismic exploration using swept frequency vibrators is well known. Briefly stated, the method comprises the steps of imparting seismic energy into the earth with the swept frequency vibrator at a first point and recording the earth's response thereto with seismic wave detectors at other separate points on the earth's surface. The earth's response is recorded as an electric signal. By crosscorrelating a pilot sweep signal (which is used to control the vibrator) with the electric signals produced by each seismic wave detector, a number of traces representative of the earth's subterranean formations can be formed.

Due to the relatively low seismic energy produced by swept frequency vibrators, as well as to cancel a portion of the noise generated by the vibrators, it is customary to employ simultaneously several vibrators deployed in a pattern on the earth's surface to impart seismic energy and then subsequently to composite the individual recordings obtained from a number of adjacent patterns. Typically, four vibrators will simultaneously generate and impart seismic energy in a pattern and twenty or more of such patterns will be used to produce seismic signals which are composited to form a single vibrator point recording. Simultaneous use of several swept frequency vibrators requires synchronization so that the individual signals will reinforce. If during any one cycle of imparting seismic energy, the vibrators are not synchronized, (i.e., they produce different phase, amplitude and/or frequency seismic energy) destructive cancelation can degrade the received signals producing noisy traces in which desired reflection signals are obscured. Alternatively, a single vibrator can be employed to impart seismic energy into the earth at a plurality of locations and the resulting recorded signals can be summed to form a single vibrator point recording. Consequently, it is necessary that the seismic energy imparted by the single vibrator at different locations also be synchronized to ensure reinforcement of the signals during the summation process.

When seismic data are collected using swept frequency vibrators, it is crucial for the subsequent processing of the recorded seismic data that one have accurate knowledge of the nature of the signal imparted by the swept frequency vibrator. The swept frequency vibrators used in seismic prospecting produce sinusoidal, swept frequency signals whose amplitude and phase are dependent upon the swept frequency vibrator's electromechanical characteristics and the complex impedance of the earth beneath its baseplate. As a matter of practice, the signal imparted by the swept frequency vibrator is assumed to be substantially identical to a phase-shifted/timedelayed version of the pilot sweep signal which is used to control a swept frequency vibrator. By crosscorrelating the recorded seismic data with the pilot sweep signal, reflected seismic energy can be recovered and interpretations of the earth's subsurface geological structures can be made. Hence, the failure of the signal imparted by the swept frequency vibrator to track the pilot sweep signal in phase and frequency can result in serious errors in processing the recorded seismic data and consequently produce a false picture of or obscure the earth's subsurface geological structures.

Traditional vibrator quality control practices have required that a "similarity" test be run daily prior to commencing seismic data acquisitions to verify vibrator performance. The similarity test includes a comparison of selected vibrator output signals with the pilot sweep signal and/or output signals from other vibrators. The selected vibrator output signals can include baseplate velocity and reaction mass acceleration obtained from sensors integrally mounted with the swept frequency vibrator. After the similarity test has been conducted, generally there is no further check of vibrator performance during that day.

Until recently, vibrator performance in the field has been evaluated based on separate recordings and displays of vibrator output signals and pilot sweep signals. Typically, such recordings and displays comprise camera records which provide a very poor method for obtaining quantitative values of the vibrator output signals. Additionally, it is very difficult to analyze for more detailed information such as phase relationships of the output signals with the pilot sweep signal controlling the swept frequency vibrator.

Vibrator control units mounted with swept frequency vibrators have been developed to synchronize the velocity component of the vibrator baseplate with the pilot sweep signal. Such vibrator control units simultaneously monitor both the pilot sweep signal controlling the vibrator and the vibrator baseplate velocity or some other aspect of vibrator performance. The vibrator control units develop feedback signals to control the electromechanical actuator of the vibrator so as to phase-lock the pilot sweep signal and the baseplate velocity. Similar vibrator control units mounted with swept frequency vibrator have been provided to control groundforce amplitude and phase. The Sallas U.S. Pat. No. 4,637,002 is exemplary of such vibrator control units. However, such vibrator control units all suffer common limitations in that they provide no means for ascertaining vibrator operating characteristics independent of the vibrator's own sensing system, they provide no display to compare various aspects of the vibrator performance, and they fail to monitor sufficient vibrator operating characteristics to fully analyze and adjust the performance of the vibrator. Rather, performance is often judged solely on the basis of differences in the initiation (start) time and phase and it is mistakenly assumed that the amplitude of the baseplate will be uniform over the sweep bandwidth. Baseplate signal reproducibility, amplitude and distortion are equally important but less frequently used quality control criteria. Heretofore, these parameters were seldom specified or tested because they required time-consuming computer analysis of recorded vibrator output signals.

More recently, Pelton Company, Inc. has developed a system for monitoring vibrator performance. This system receives both the pilot sweep signal and an output signal from the vibrator and produces separate numeric printouts representing either frequency, relative amplitude or phase as a function of selected time intervals. This method is an advance in the testing of the swept frequency vibrators in the field; however, it lacks the ability to provide independent, calibrated measurements of swept frequency vibrator system performance.

Specifically, it does not provide for verifying the correctness of the vibrator output signal used. This shortcoming becomes an even more important discrepancy when a groundforce signal is used to control the swept frequency vibrator. Additionally, the Pelton system fails to provide simultaneous analog displays of the pilot sweep signal and various output signals of the vibrator; rather, the Pelton system prints numeric values of the pilot sweep signal amplitude; vibrator output signal amplitude and phase; and the difference in phase of the pilot sweep signal and the vibrator output signal.

Texas Instruments has also developed a field system for quality control of swept frequency vibrators. This system provides more sophisticated processing of the pilot sweep signal and output signals of the vibrator. The Texas Instruments system cross compares any two sweep traces of the vibrator and outputs them to a plotter. But for the displays of two such sweep traces, it is understood that the Texas Instruments system merely displays a single representation of one of the following: auto correlation of the pilot sweep signal; crosscorrelation of the pilot sweep signal with an output signal of the vibrator; power spectrum of the pilot sweep signal; power spectrum of the output signal of the vibrator; power spectral difference between the pilot sweep signal and output signal; and a harmonic distortion plot. The Texas Instruments system also produces a numeric listing of power spectral differences as well as instantaneous frequency and phase difference versus time.

Others have developed computer programs designed to remotely analyze vibrator performance. The analysis associated with these programs has two serious shortcomings. First, as with the previous field devices, independent and calibrated measurements of the system performance are not available as input to the programs. Second, although the analyses performed by these programs are generally more detailed than that provided by field units, the remote location of the host computer is such that real-time field analysis and adjustment of vibrator performance is not possible.

The present invention is directed to a field quality control system for analyzing and adjusting in substantially real-time the performance of swept frequency vibrators which overcomes the limitations of existing systems. Specifically, the system includes independent calibrated accelerometers which are detachably mounted with the reaction mass and baseplate of the vibrator. The signals generated by such accelerometers are monitored and processed in real-time on location to provide immediate results of vibrator performance. This real-time field analysis is of extreme value since it allows monitoring the vibrator performance as adjustments are made. Thus, vibrators can be interactively adjusted and analyzed until performance specifications are achieved.

The system can display simultaneously and interactively two or more analysis characteristics representing the forces acting on the vibrator mass and baseplate, the groundforce as well as baseplate velocity and pilot sweep signals. These analysis characteristics can be displayed in their raw form, as crosscorrelated wavelet data, amplitude spectra data, phase spectra data or harmonic distortion. The displays can be scaled and/or windowed interactively in real-time. The analysis characteristics can be overlayed, archived for later recall, or spooled to a hardcopy device for documentation. The vibrator hold-down force can also be overlayed on the amplitude spectra data to indicate the limits of decoupling. Additionally, the phase error tolerance can be overlayed onto the phase spectra data, indicating acceptance levels of phase-locking of the vibrators.

The quality control system is also of considerable value in establishing operational parameters for swept frequency vibrators for a particular site location. In such cases, the swept frequency vibrator's performance is monitored and adjusted on site for optimized performance at a particular site location. Further, the system can provide useful diagnosis for correcting vibrator deficiencies. Moreover, for diagnostics not apparent from normal analysis, a plurality of vibrator deficiencies can be simulated with the system and identified through such analysis rather than through physically interchanging components of the swept frequency vibrator and observing the resulting performance to see if the problem has been corrected.

SUMMARY OF THE INVENTION

A field quality control system and real-time method for evaluating the performance of swept frequency vibrators is provided. The system includes independent sensing means adapted to be mounted with the swept frequency vibrators for developing signals representative of the vibrator's reaction mass acceleration and baseplate acceleration, and means for monitoring the pilot sweep signal controlling the swept frequency vibrator. The system also includes calculating means for determining vibrator performance characteristics from the pilot sweep signal, reaction mass acceleration signal, and baseplate acceleration signal and processing means for processing the vibrator performance characteristics to obtain analysis characteristics of the swept frequency vibrator. Additionally, the system includes means for simultaneously displaying two or more analysis characteristics for analyzing and adjusting the performance characteristics of the swept frequency vibrator in real-time. In operation, the method of the present invention provides a plurality of analysis characteristics for analyzing and adjusting the performance characteristics of swept frequency vibrators in real-time on location.

DESCRIPTION OF THE PREFERRED EMBODIMENT

Figure 1:
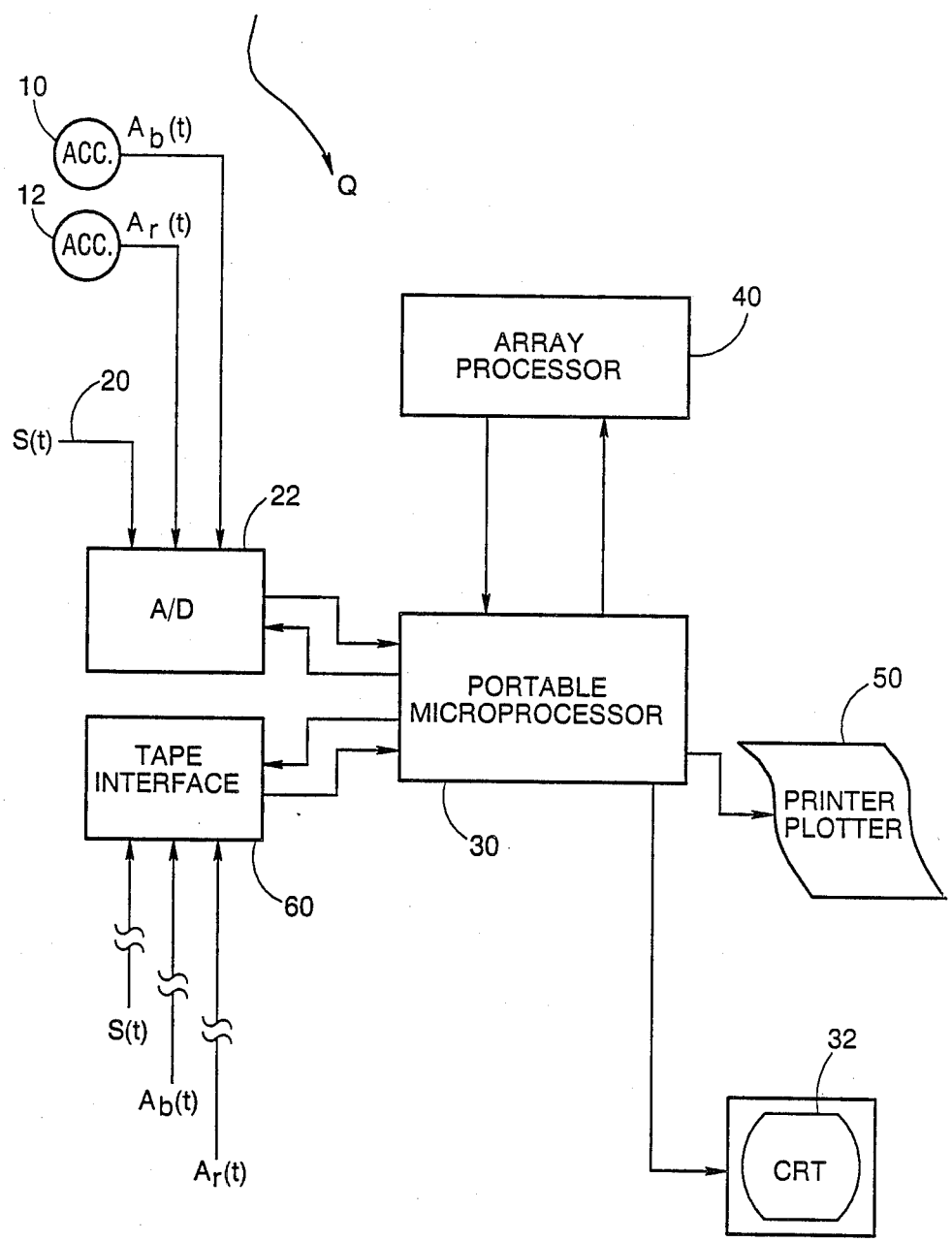
FIG. 1 is a schematic representation of the present invention.

As an aid in understanding the present invention, the following discussion of seismic data acquisition employing a swept frequency vibrator is provided.

The general method of seismic exploration using swept frequency vibrators comprises imparting seismic energy into the earth at selected vibration points along the earth's surface and recording the earth's response thereto with seismic wave detectors spaced at recording points selected distances from the vibration points. The seismic energy imparted by the vibrator is sinusoidal with a continuously varying frequency. A pilot sweep signal or reference sweep signal S(t) is employed to control the swept frequency vibrator. Such pilot sweep signals S(t) are sinusoidal with a continuously varying frequency having a duration of typically seven or more seconds. The pilot sweep signal S(t) starts at a low frequency and increases frequency as a function of time; alternatively, it may start with a higher frequency and decreases frequency as a function of time. In either event, it is necessary that the signal imparted by the swept frequency vibrator track the frequency and phase of the pilot sweep signal S(t). This level of performance by the swept frequency vibrator is required because the signals recorded by the seismic wave detectors are crosscorrelated with the pilot sweep signal S(t). To the extent that the performance of the vibrator produces seismic energy of differing frequency, phase and/or amplitude, the resulting crosscorrelated signals are in error and interpretation of the data can be erroneous.

Typically, phase and amplitude of selected vibrator output signals and phase of the pilot sweep signal can be employed to control vibrator performance. Four modes of vibrator control are currently employed for seismic exploration. First, a baseplate acceleration phase control mode attempts to control vibrator performance by phase locking the baseplate acceleration and pilot sweep signals and setting vibrator drive level. Vibrator drive level provides an indirect measure of the amplitude of the signal imparted by the vibrator. Second, a ground-force phase control mode attempts to control vibrator performance by phase locking the ground-force and pilot sweep signals and setting vibrator drive level. Third, a groundforce amplitude and phase control mode attempts to control vibrator performance by phase locking the ground-force and pilot sweep signals and by controlling ground-force amplitude. Fourth, a groundforce amplitude control mode attempts to control vibrator performance by phase locking ground-force and baseplate acceleration and by controlling groundforce amplitude.

Recent advances in vibrator performance have resulted in phase-locked groundforce control systems such as described by Sallas in the U.S. Pat. No. 4,637,002. With groundforce control units, it is even more important to independently monitor the vibrator performance to ensure acceptable quality data. Typically, quality control checks on swept frequency vibrators have included running "similarity" tests. The similarity tests comprise a comparison of selected output signals of the vibrator with the pilot sweep signal S(t) or output signals from other vibrators. Field analysis of the similarity tests have included a visual inspection of separate camera output records for each of the signals being compared and analyzed. As shall be set forth below, we have developed a novel real-time method and field system for analyzing and adjusting the performance characteristics of seismic swept frequency vibrators which overcome the limitations of existing methods and systems.

Specifically, looking now to FIG. 1, a schematic representation of the system of the present invention is provided. The system is generally indicated by the letter Q and includes a set of calibrated accelerometers 10, 12 each adapted to be detachably mounted with a swept frequency vibrator's reaction mass and baseplate, respectively (not shown). Preferably, the accelerometers 10, 12 can be magnetically mounted with the reaction mass and baseplate of the vibrator for ease in mounting and removing. Calibration of the accelerometers 10, 12 is important to provide accurate measures of vibrator performance. To ensure a complete check of the vibrator's performance (including its integrally mounted accelerometers), the accelerometers 10, 12 are not the accelerometers integrally mounted with the vibrator. The accelerometers 10, 12 generate reaction mass acceleration $A_r(t)$ and baseplate acceleration $A_b(t)$ signals, respectively. Additionally, the system Q includes input means 20 for monitoring a pilot sweep signal S(t) controlling the swept frequency vibrator. Alternatively, as will be further discussed below, the pilot sweep signal S(t) can be retrieved from an archived pilot sweep signal S(t). The duration of the pilot sweep signal S(t), its start and stop frequency as well as its start and stop frequency tapers are input to the system Q and can be used to determine the limits for displaying the results of frequency domain processing. The signals S(t), $A_r(t)$, and $A_b(t)$ are communicated to an analog-to-digital converter 22 where they are digitized or through an external field recording system (not shown) where they can be captured by tape interface 60 and then to a portable microprocessor 30.

In a preferred embodiment, the analog-to-digital converter 22 is a Data Translation A/D board having 8 differential (i.e., 16 single-ended) A/D channels, 8 differential (i.e., 16 single-ended). The A/D channels have an 8 kHZ throughput and a software selectable gain range from 1 (10 volts full scale) to 500 (20 millivolts full scale) with 12 bit resolution. The portable microprocessor 30 can include a COMPAQ 286 personal computer employing an 80287 math coprocessor, 640K RAM memory and both hard disk and high density floppy disk storage. The portable microprocessor 30 also includes a built-in CRT display 32 and keyboard (not shown) which add to the overall portability of the system Q.

The system Q also includes an array processor 40 bused to the microprocessor 30. Preferably, the array processor 40 is a Weitek Array Processor connected to a 16 bit bus of the microprocessor 30 for high speed data transfers. The system Q further includes a printer/plotter 50 in communication with the microprocessor 30. Additionally, the system Q can include a tape interface 60 in communication with the microprocessor 30. The tape interface 60 is a general purpose digital board adapted to passively capture data from a field recording system (not shown).

Figure 2:
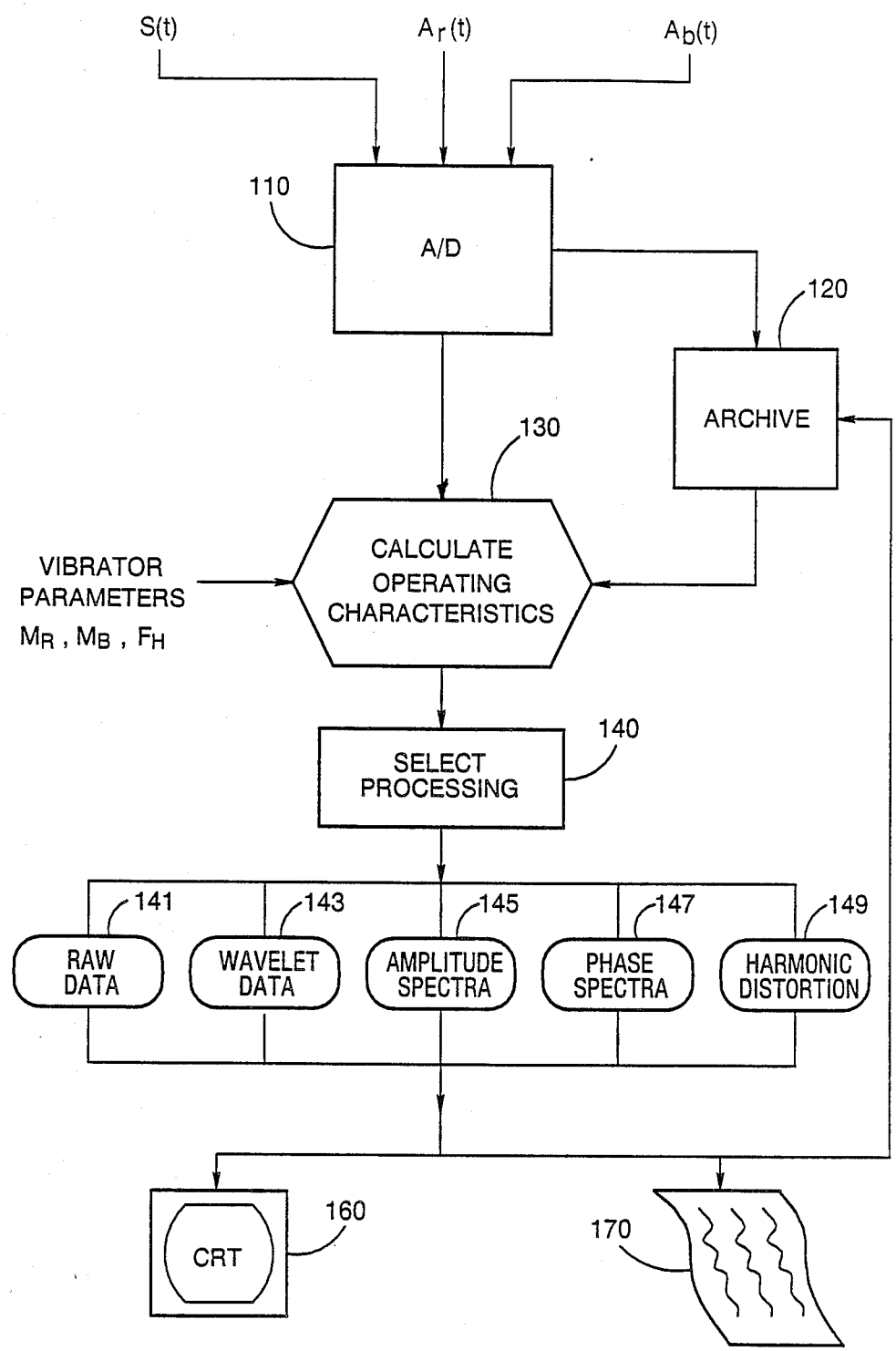
FIG. 2 is a generalized flow diagram of the present invention.
Figure 3A:
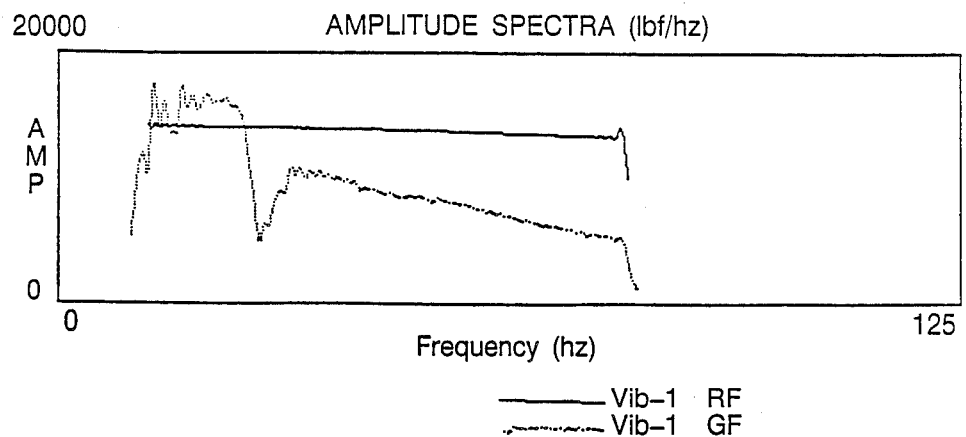
FIGS. 3a and 3b represent amplitude spectra data and phase spectra data displays according to the present invention of a first vibrator assumed to be operating in a groundforce amplitude control and baseplate acceleration phase mode from 10–80 Hz.
Figure 3B:
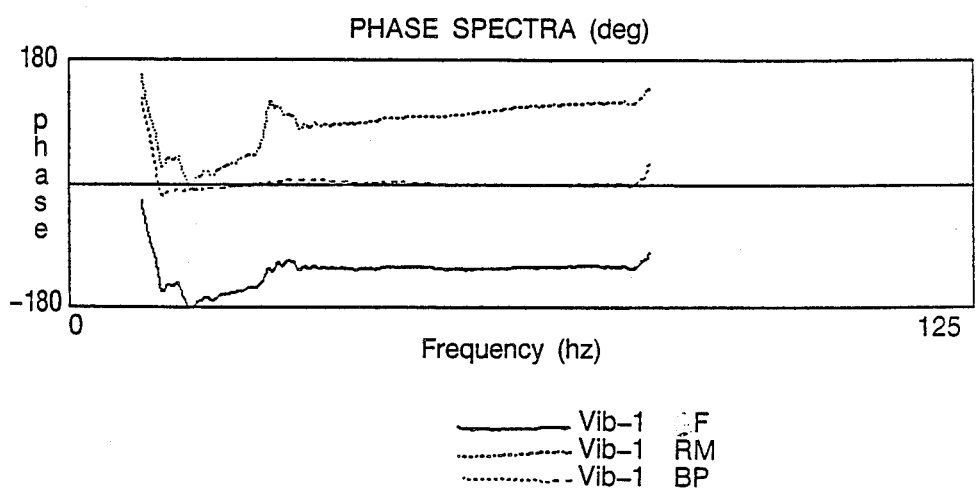
Figure 4A:
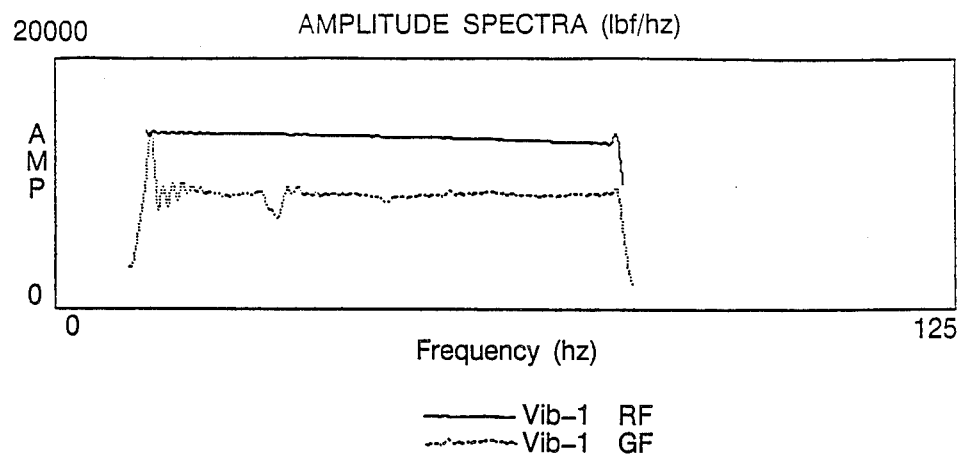
FIGS. 4a and 4b represent the amplitude spectra data and phase spectra data displays according to the present invention with the first vibrator operating in a groundforce amplitude control and baseplate acceleration phase mode from 10–80 Hz.
Figure 4B:
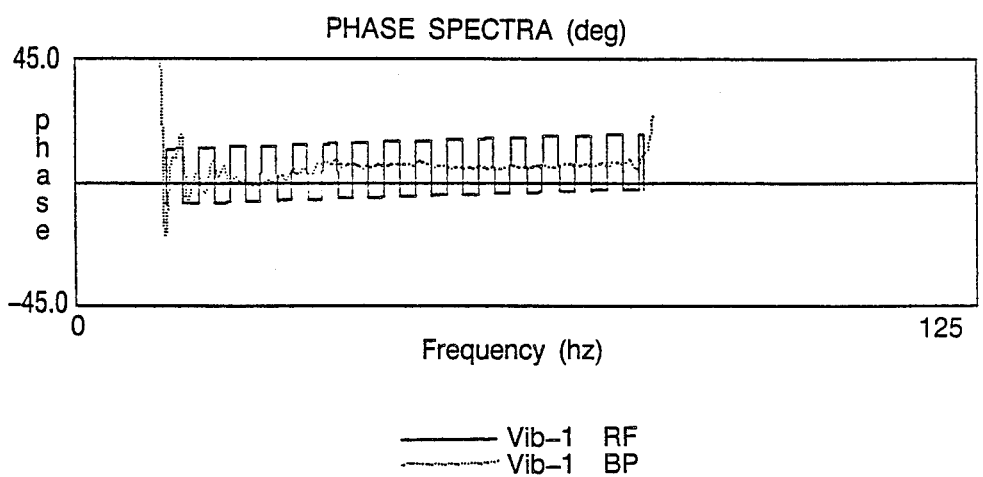

Looking now to FIG. 2, a generalized process flow diagram of the present invention is shown. The monitored pilot sweep or reference signal S(t) as well as the independently developed baseplate acceleration signal $A_b(t)$ and reaction mass acceleration signal $A_r(t)$ are filtered and digitized at 110. Preferably, the filtering includes anti-alias filtering. These signals can also be archived at 120 for subsequent reprocessing if desired. For example, it may be desirable to archive pilot sweep signal $S(t)$ to compare it with the pilot sweep signal actually controlling the vibrator or for comparing the operations of two or more vibrators. Before commencing analysis and adjustment of the swept frequency vibrator, a vibrator identifier as well as its specific reaction mass $M_R$, baseplate mass $M_B$, and holddown force $F_H$ are input to the system Q whereby, operating characteristics including reaction mass force $F_r$, baseplate force $F_b$, groundforce $F_g$, and baseplate velocity $V_b$ can be calculated at 130 as follows:

$$F_r = A_r(t) \, M_R$$

$$F_b = A_b(t) \, M_B \qquad (1)$$

$$F_g = -(F_r + F_b)$$

$$V_b = \int A_b(t) dt$$

The operating characteristics $S(t)$, $F_r$, $F_b$, $F_g$ and $V_b$ can be processed at 140 according to any or all of five processes selected and applied to selected of these operating characteristics to obtain a plurality of analysis characteristics. The five processes can include: raw data processing, wavelet data processing, amplitude spectra data processing, phase spectra data processing and harmonic distortion processing. The start and end frequency of the pilot sweep signal $S(t)$ along with sweep duration and frequency tapers can be employed to determine the limits for displaying the analysis characteristics in the frequency domain, e.g., amplitude spectra data and phase spectra data. The results of such processing can be stored in archive 120 for later recall and display.

Raw data processing at 141 produces a first set of analysis characteristics which are essentially scaled versions of $S(t)$, $F_r$, $F_b$, $F_g$ and $V_b$. The raw data processing calculates the operating characteristics with DC removed, A/D channel skew removed and scaled to absolute force levels. The pilot sweep signal $S(t)$ can be scaled to reflect the holddown force $F_H$ of the swept frequency vibrator.

Wavelet data processing at 143 produces a second set of analysis characteristics which are crosscorrelations of the operating characteristics with the pilot sweep signal $S(t)$. The pilot sweep signal thus correlated is an autocorrelation function. Displaying the wavelet analysis characteristics with a wide window on a logarithmic scale along with the reference wavelet can provide a good indication of the distortion effects in the side lobes of the imparted seismic energy.

Amplitude spectra data processing at 145 produces a third set of analysis characteristics which are the amplitude spectra for each of the operating characteristics. The amplitude spectra data are represented in absolute force per hertz units. The comparison of the amplitude spectra of the groundforce $F_g$ to the pilot sweep signal $S(t)$ scaled to the holddown force $F_H$ can provide a good indication of how close the vibrator is to decoupling. The amplitude spectra can also be displayed between the start and end sweep frequencies of the pilot sweep signal $S(t)$. The amplitude spectra of the pilot sweep signal $S(t)$ can be displayed in a slightly smaller frequency window reflecting the taper length on each end of the pilot sweep signal and a 500 m/sec additive tolerance delay at the beginning of the sweep to allow the vibrator time to lock onto the pilot sweep signal.

Phase spectra data processing at 147 produces a fourth set of analysis characteristics which are the crosscorrelated phase spectra of each of the operating characteristics. The phases are unwound to avoid phase wrapping and converted to degrees. The pilot sweep signal phase spectra is a tolerance function indicating a 10° phase tolerance of a phase lock signal (typically groundforce, baseplate velocity or acceleration) about a straight line. The slope of the phase spectra can indicate a time delay or advance between the pilot sweep signal and the corresponding operating characteristics signal. The time delay and phase intercept values can be displayed and/or printed out separately. The standard time delay or phase plot tolerance is typically 0.125 m/sec. The phase spectra of the pilot sweep signal $S(t)$ can be displayed in a slightly smaller frequency window reflecting the taper length on each end of the pilot sweep signal and a 500 msec additive tolerance to delay at the beginning of the sweep to allow the vibrator time to lock onto the pilot sweep signal.

Harmonic distortion processing at 149 produces a fifth set of analysis characteristics which are Fourier transformations of the signals $F_r$, $F_b$, $F_g$, and $V_b$, i.e., the fifth set of analysis characteristics provide frequency as a function of time information whereby harmonic distortion can be analyzed.

Simultaneous displays of selected combinations of the analysis characteristics at CRT 160 or plotter/printer 170 can be used to analyze and adjust the performance of the vibrators. Also, vaious display parameters of the analysis characteristics can be controlled whereby linear or logarithmic scales, time windows, frequency windows, etc., can be selected. The specific interpretation of the results generally comes with experience in using the system. In any event, consistency of results of each vibrator between sweeps from day to day and from vibrator to vibrator are a good indication of vibrator performance. The sets of analysis characteristics can be archived at 120 for recall and comparison with later developed sets of analysis characteristics.

The displays of raw data can be used to verify that the vibrator's integrally mounted accelerometers are operating properly and are not decoupled. These displays can also provide confidence that the A/D input and array processor of the system Q are functioning properly. The wavelet data can be displayed within a wide window and using a selected log scale can provide a method of indicating harmonic distortion by observing the side lobe levels in comparison to the pilot sweep signal. Additionally, harmonic distortion processing can provide an indication of the efficiency of the vibrator output as well as observe harmonic distortion effects. The wavelet processing also shows the effect of all the amplitude phase distortion on the seismic wavelet being imparted into the earth.

The displays of amplitude spectra analysis data reveal the consistency of vibrator output. A linear pilot sweep signal should provide a flat groundforce amplitude spectra within a 3 db fluctuation if groundforce amplitude control is being applied to the vibrators. Amplitude variations can occur at ground resonance or as a result of 50/60 Hz electrical pick up in the cables. These typically do not cause problems with the evaluation of the vibrator performance. Other problems such as resonance within the vibrator hydraulics and mechanical structure will be of more concern. Typically, at higher frequency, problems with the vibrator feedback control valves tend to be more prominent. The vibrator accelerometers themselves and the way they are mounted with the reaction mass and baseplate have also been commonly observed problems. Phase spectra data ensure that the correct phase relationship exists between the selected vibrator operating characteristics, i.e., $F_r$, $F_g$, $F_b$, $V_b(t)$ The reaction mass phase and baseplate phase tend to be close at the lower frequencies with the reaction mass phase increasing above baseplate phase until they approach approximately 180° out of phase at higher frequencies. This is a matter of degree depending on the ground conditions and frequency range of the pilot sweep signal being used. To ensure that the vibrator is locking onto the correct signal, the signal being used to control the vibrator's phase locking should appear nearly flat in the phase spectrum.

EXAMPLE OPERATIONS

Looking now to FIGS. 3–7, the vibrator quality control system and method of the present invention were employed to analyze and adjust the operating parameters of four Mertz model 18 swept frequency vibrators. Looking first to FIGS. 3a and 3b, both amplitude spectra and phase spectra displays for vibrator 1 are shown with the vibrator assumed to be operating in a groundforce amplitude and baseplate acceleration phase control mode from 10–80 Hz. The amplitude spectra display of FIG. 3a includes both the reference signal RF scaled to the holddown force and vibrator groundforce amplitude GF. However, the amplitude spectra display for the groundforce GF is not flat as it should be in the groundforce amplitude control mode. In fact, possible decoupling of vibrator 1 is indicated where the groundforce GF exceeds the holddown force scaled reference signal RF. The phase spectra display of FIG. 3b includes the groundforce GF phase and reaction mass RM phase as well as baseplate acceleration BP phase. The phase spectra display indicates that vibrator 1 is phase locking on baseplate acceleration BP phase. Upon investigation of vibrator 1 and its vibrator control unit, it was determined that the vibrator control unit groundforce selector switch was turned off. With vibrator 1 groundforce control switch turned on, look now to FIGS. 4a and 4b where amplitude spectra and phase spectra displays for vibrator 1 operating in a groundforce amplitude and baseplate acceleration control mode from 10–80 Hz is shown. Specifically, FIG. 4a depicts the reference signal RF scaled to the holddown force and the ground-force GF amplitude. Notice the much flatter appearance of the groundforce GF amplitude in FIG. 4a than in FIG. 3a. FIG. 4b depicts the phase spectra of the reference signal RF and the baseplate acceleration BP.

Figure 5A:
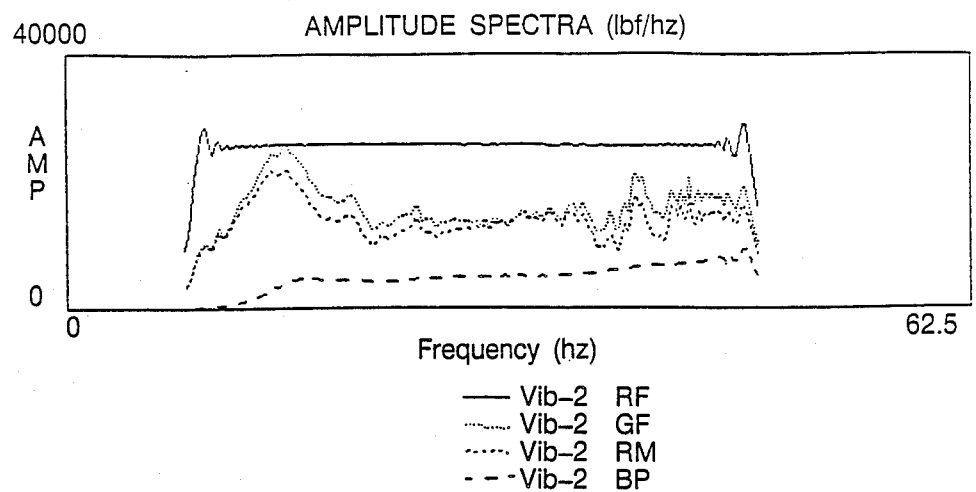
FIGS. 5a and 5b represent amplitude spectra data and phase spectra data displays in accordance with the present invention with a second vibrator assumed operating in a groundforce phase control mode at 10% drive level from 6–48 Hz.
Figure 5B:
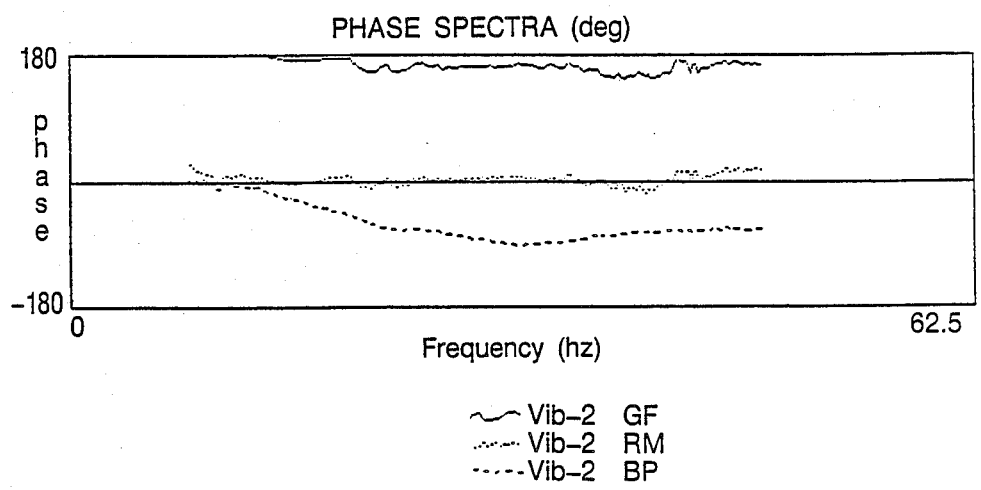

FIGS. 5a and 5b depict the amplitude spectra and phase spectra displays of vibrator 2 operating in a groundforce phase control mode at 10% drive level from 6–48 Hz. In particular, the amplitude spectra displays of FIG. 5a include a holddown force scaled reference signal RF, groundforce GF amplitude, reaction mass force RM, and vibrator baseplate force BP. The phase spectra display of FIG. 5b shows that the groundforce GF phase, reaction mass force RM phase and baseplate force BP phase indicates that vibrator 2 is locking onto the reaction mass RM phase. After inspection of vibrator 2, the vibrator's integrally mounted baseplate accelerometer was found to have a defective accelerometer cable.

Figure 6A:
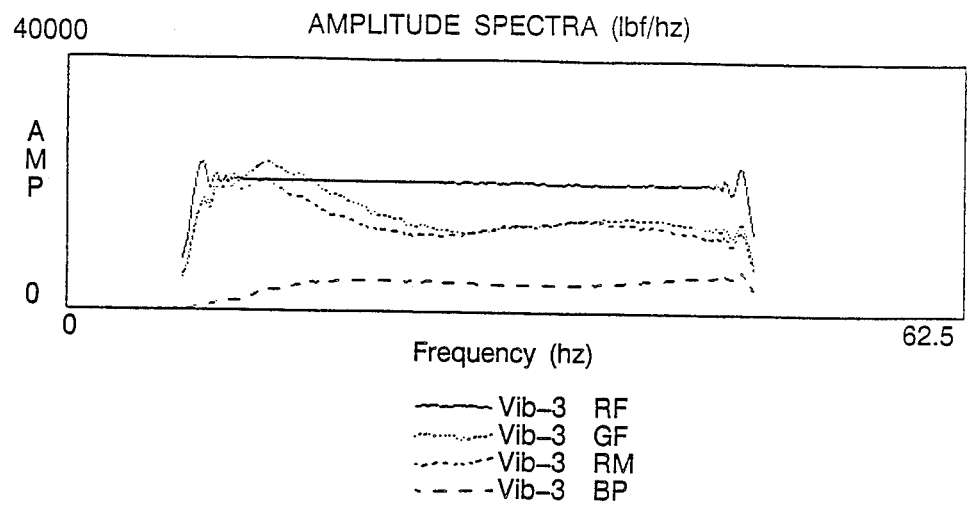
FIGS. 6a and 6b represent amplitude spectra data and phase spectra data displays in accordance with the present invention of a third vibrator operating in a groundforce phase control mode at 10% drive level from 6–48 Hz.
Figure 6B:
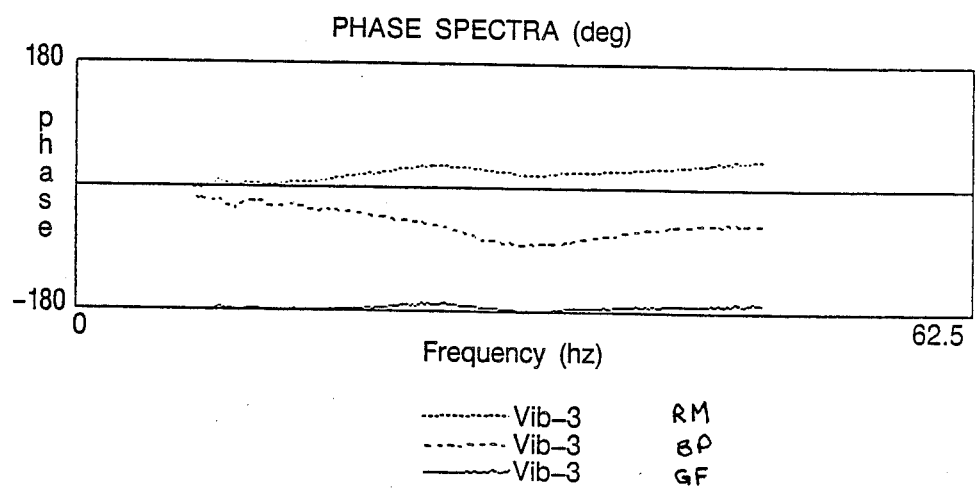

Looking now to FIGS. 6a and 6b, amplitude spectra and phase spectra displays for vibrator 3 operating in a groundforce phase control mode at 10% drive level from 6–48 Hz are shown. The amplitude spectra displays of FIG. 6a include a holddown force scaled reference signal RF, groundforce amplitude, reaction mass force RM amplitude and vibrator baseplate force BP amplitude. The phase spectra display of FIG. 6b shows the groundforce GF phase, reaction mass force RM phase, and baseplate force BP phase. It can be seen that vibrator 3 is now phase locking onto a vector combination of the reaction mass force RM phase and baseplate force BP phase.

Figure 7:
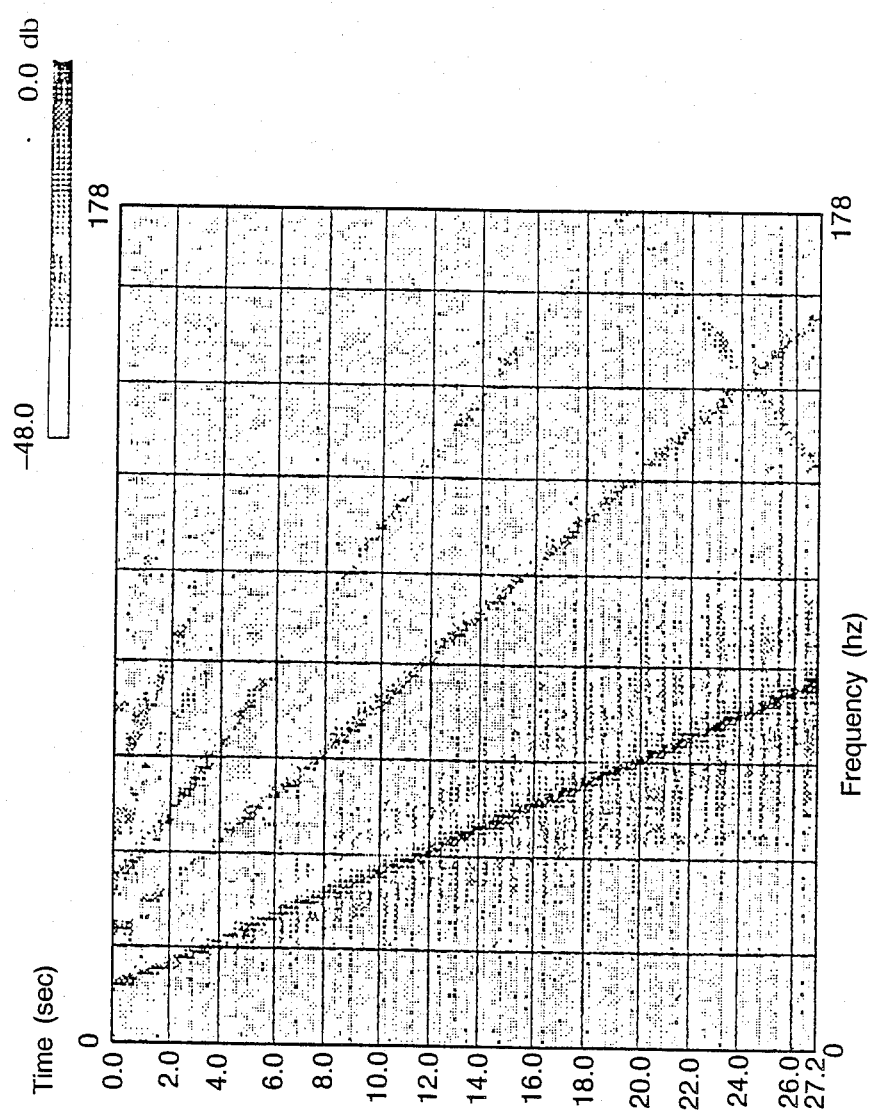
FIG. 7 represents a two-dimensional harmonic distortion display of baseplate acceleration for a fourth vibrator operating in a groundforce amplitude control mode from 10–80 Hz.

Finally, FIG. 7 represents a two-dimensional harmonic distortion plot for vibrator 4, wherein the baseplate force has been Fourier transformed to provide a harmonic distortion time-frequency plot. Vibrator 4 was operating in a groundforce amplitude control mode from 10–80 Hz. Additionally, one can obtain numeric displays and tabular printouts of the operating parameters of the vibrator.

Thus, it has been shown that applicants have developed a new method and system having the capability of analyzing and adjusting a swept frequency vibrator with independent calibrated accelerometers which can easily be magnetically mounted with the vibrator's reaction mass and baseplate. These signals are monitored and processed in real-time at the vibrator to provide immediate results of the vibrator performance. This realtime on-site analysis is of extreme value, since it allows analyzing and adjusting the vibrator performance as the vibrator is operating. Thus, vibrators can interactively be adjusted and monitored until performance specifications are achieved. This system can display interactively the signals of force acting on the reaction mass, the baseplate and the ground as well as baseplate velocity and pilot sweep signals. These signals can be shown in a raw form, crosscorrelated wavelet, amplitude spectra, phase spectra and harmonic distortion. These displays can be scaled and/or windowed interactively in real-time. The signals can be overlayed, archived for later recall or spooled to a hardcopy device for documentation. The holddown force can be overlayed on the amplitude spectra to indicate the limits of decoupling. Additionally, phase error tolerance can be overlayed onto the phase spectra plots indicating acceptance levels of phase locking of the vibrators.

The system is also of considerable value in establishing operational parameters for vibrators on the particular site location in which seismic acquisition is to occur. In such cases, the vibrator is monitored and analyzed on-site as its operational parameters are varied. For example, the duration and frequency band and the drive levels of the vibrator can be adjusted for specific site parameters of the pilot sweep signal S(t) controlling the vibrator. Further, the system is useful in diagnosing and correcting vibrator deficiencies. If the diagnosis is not normal from the conventional analysis, many vibrator deficiencies can be simulated digitally with the system and identified rather than by physically interchanging components on the vibrator and observing resulting performance to localize and identify the problem.

Additionally, it has been found that the system can provide additional quality control functions for monitoring and analyzing seismic recorded signals interactively while interfaced real-time to various recording systems, to provide a quality control function for monitoring of vertical seismic profile data interactively from one or any of several recording systems, and provide a fast field quality control to test field recording instruments, including gain, crossfeed, filter response, and distortion. While the system and method described herein provide a preferred embodiment of the invention, it is understood that the invention is not limited to these specific components and methods and that ways may be made therein without departing from the scope of the invention.

What is claimed is:

1. A method for analyzing and adjusting the performance of swept frequency vibrators with a field system, comprising the steps of:
    (a) obtaining a first set of operating characteristics of a first vibrator including accelerations of the vibrator baseplate and of the vibrator reaction mass of the first vibrator and a pilot sweep signal controlling the first vibrator;
    (b) obtaining a second set of operating characteristics of the first vibrator from the first set of operating characteristics including the first vibrator's reaction mass force, baseplate force, baseplate velocity and groundforce;
    (c) processing the first and second sets of operating characteristics to obtain a first set of analysis characteristics, wherein the analysis characteristics are selected from the group including crosscorrelated wavelet data, amplitude spectra data as a function of frequency, and phase spectra data as a function of frequency; and
    (d) analyzing the performance of the first vibrator by comparing simultaneously displayed pairs of selected analysis characteristics of the first set.

2. The method of claim 1 wherein the step of processing the first and second sets of performance characteristics comprises the step of:
    crosscorrelating the first and second sets of operating characteristics with the pilot sweep signal.

3. The method of claim 2 further including the step of:
    determining the phase spectra from crosscorrelated first and second sets of operating characteristics.

4. The method of claim 2 wherein the step of processing the first and second sets of performance characteristics to obtain analysis characteristics comprises the step of:
    determining the amplitude spectra for the first and second sets of operating characteristics.

5. The method of claim 1 wherein the step of processing the first and second sets of performance characteristics to obtain analysis characteristics comprises the step of:
    scaling the first and second sets of operating characteristics according to a holddown force of the vibrator.

6. The method of claim 1 comprising the further step of:
    comparing a display of at least one of a plurality of analysis characteristics with a simultaneous display of the vibrator holddown force.

7. The method of claim 1 further including the step of:
    archiving the analysis characteristics for the first vibrator.

8. The method of claim 7 further including the steps of:
    (a) repeating the steps (a)–(d) for a second swept frequency vibrator;
    (b) retrieving the archived set of analysis characteristics for the first vibrator; and
    (c) simultaneously displaying selected analysis characteristics for the first and second vibrators to analyze and adjust the performance of the first and second vibrators.

9. The method of claim 1 further including the steps of:
    (a) adjusting the first vibrator operating characteristics responsive to the obtained analysis characteristics;
    (b) obtaining a second set of analysis characteristics for the first vibrator; and
    (c) analyzing the performance of the first vibrator by comparing simultaneously displayed pairs of analysis characteristics of the first and second sets.

10. A system for analyzing and adjusting the performance of swept frequency vibrators in the field, comprising:
    (a) sensing means mounted with the vibrator reaction mass and sensing means mounted with the vibrator baseplate for obtaining signals representative of reaction mass acceleration and baseplate acceleration;
    (b) means for monitoring pilot sweep signals controlling the swept frequency vibrator;
    (c) calculating means for determining a set of operating characteristics from the reaction mass acceleration signal, baseplate acceleration signal and pilot sweep signal;
    (d) processing means for processing the operating characteristics and obtaining a plurality of sets of analysis characteristics; and
    (e) means for simultaneously displaying two or more analysis characteristics for analyzing and adjusting the performance of the swept frequency vibrator.

11. The system of claim 10 further including:
    means for digitizing the reaction mass acceleration signal.

12. The system of claim 10 further including:
    means for archiving the reaction mass acceleration signal, baseplate acceleration signal, and pilot sweep signal.

13. The system of claim 10 further including:
    means for retrieving archived pilot sweep signals whereby both operating characteristics and analysis characteristics can be compared with the archived pilot sweep signal.

* * * * *

UNITED STATES PATENT OFFICE
CERTIFICATE OF CORRECTION

PATENT NO. : 4,782,446

DATED : November 1, 1988

INVENTOR(S) : Jerry W. Ehlers/O. Guy Marney, Jr./Randol R. Read/Daniel T. Johnson/Jerome D. McCoy, Jr.

It is certified that error appears in the above-identified patent and that said Letters Patent is hereby corrected as shown below:

On the title page;

The first-named inventor's name is shown incorrectly on the patent as "Jerry W. Ehler". The correct name is -- Jerry W. Ehlers --.

Signed and Sealed this

Seventeenth Day of July, 1990

Attest:

HARRY F. MANBECK, JR.

Attesting Officer

Commissioner of Patents and Trademarks